3,639,326
VINYL TERPOLYMER COMPOSITIONS
Raymond J. Kray, Berkeley Heights, Marvin T. Tetenbaum, Convent Station, Wilbert M. Wenner, Rockaway, and Oliver A. Barton, Florham Park, N.J., assignors to Allied Chemical Corporation, New York, N.Y.
No Drawing. Filed May 20, 1968, Ser. No. 730,644
Int. Cl. C08f 45/00
U.S. Cl. 260—29.6                5 Claims

ABSTRACT OF THE DISCLOSURE

Latices prepared by the emulsion copolymerization of vinyl chloride, ethylene and a third ethylenically unsaturated carboxylic ester monomer afford films having a combination of desirable properties. Additionally, such latices can be formulated into paints which are fire and mildew resistant.

BACKGROUND OF THE INVENTION

This invention relates to latices containing a terpolymer of vinyl chloride, ethylene, and a third ethylenically unsaturated carboxylic acid monomer and to coatings formed therefrom. More particularly, this invention relates to the preparation of such latices wherein the terpolymer consituent of such latex incorporates the three monomer constituents in particular proportions. The latices containing terpolymer having such particular proportions of monomeric constituents, as will be more fully described hereinafter, have been found to afford coatings of exceptional toughness, i.e., high tensile strength and ultimate elongation, and also, excellent water resistance, and further to provide paints which show exceptional fire retardancy and mildew resistance.

DESCRIPTION OF THE PRIOR ART

Latices containing ethylene/vinyl chloride or ethylene-vinyl acetate copolymer are described in U.S. Pat. 3,271,373. British Patent No. 1,035,339 describes the preparation of low toughness value ethylene/vinyl chloride copolymers and also terpolymers of ethylene, vinyl chloride and a third vinylic monomer which polymers are useful as molding materials.

In many applications it is desired to form a coating or film of a polymer on a substrate by depositing the polymer in the form of a latex onto the substrate and then allowing the aqueous component of the latex to evaporate. To be acceptable, a film formed in this fashion must meet certain standards of toughness as measured by tensile strength and ultimate elongation. Additionally, the film must be continuous, that is, when the aqueous latex menstruum is evaporated, the polymer particles must coalesce and form a substantially pore-free film over the substrate being coated. Preferably, such film formation will occur at ambient temperature without the application of external heat. Ethylene/vinyl acetate copolymer films are deficient in being excessively water permeable. When ethylene/vinyl chloride copolymer-containing latices are deposited, the films formed therefrom are found to lack sufficient toughness. Ethylene/vinyl chloride copolymer films of improved, although still not fully acceptable, toughness can be obtained by carrying out the emulsion copolymerization at very high pressure or low temperature or both. However, such extreme reaction conditions are undesirable because they entail additional expense and cause control problems that make it difficult to obtain a uniform, consistent product.

SUMMARY OF THE INVENTION

It is an object of this invention to provide latices comprising modified ethylene/vinyl chloride copolymers capable of depositing at ambient or elevated temperature continuous substantially pore-free films of exceptional toughness. It is a further object of this invention to provide polymers of comparatively low molecular weight that can be prepared at conventional polymerization pressures and temperatures at easily and consistently controlled rates. It is a still further object of this invention to provide a latex containing a modified ethlene/vinyl chloride polymer which latex may be formulated into a superior paint having a number of unexpected and valuable properties.

It has now been found in accordance with this invention that latices wherein the polymer component is a terpolymer containing from about 66 to about 79 weight percent vinyl chloride, from about 17 to 30 weight percent ethylene, and from about 1.0 to 10 weight percent of a copolymerizable, ethylenically unsaturated carboxylic ester, afford films of outstandingly supreior toughness and can also be formulated into improved paints. To provide such properties, the terpolymer must contain all three monomeric components, and all three must be incorporated into the polymer in an amount within the above-specified respective ranges. Preferably the polymer composition is 68 to 76 weight percent vinyl chloride, 21 to 30 weight percent ethylene and 1.5 and 8 weight percent unsaturated ester.

The terpolymer itself contains no other constituents so that the total of the three monomeric components is always 100%. Use of amounts of the individual monomers outside of these ranges leads to undesirable properties in film-forming behavior and resultant film properties. Latices of terpolymers containing vinyl chloride in excess of the specified amount do not coalesce into continuous films upon drying. Amounts of vinyl chloride below the minimium afford films of poor tensile strength. Those containing ethylene in excess of the specified amount yield films of low tensile strength.

Terpolymers containing greater than 10 weight percent ethylenically unsaturated carboxylic ester are unduly water sensitive.

The toughness of a film is dependent upon two properties. First, the tensile strength of the film as measured by ASTM Test D822–64T and, second, its ultimate elongation as measured by ASTM Test D1708–66. Many known polymers form films which are high in either tensile strength or ultimate elongation, but not in both. Toughness is generally expressed as the product of these two properties, i.e., tensile strength times ultimate elongation. Film prepared from latices of terpolymers of this invention have toughness values ranging from at least about 450,000 up to about 900,000.

The terpolymers of the instant invention, which provide room-temperature coalescable films of excellent toughness, have glass transition temperatures (Tg) ranging from about −6° C. to about +18° C. Particularly good films are formed from terpolymers having a Tg ranging from about −3° to about +10° C.

The term ethylenically unsaturated carboxylic ester, as used herein, connotes compounds of the structure $$X-C=C-X$$

wherein X is H, R,

wherein R is a $C_1$ to $C_{12}$ alkyl group, and wherein at least one X substituent is selected from the group consisting of

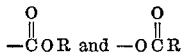

Suitable ethylenically unsaturated esters include methyl, ethyl, n- and isopropyl, n-butyl, t-butyl, n- and isoamyl, hexyl, 2-ethylhexyl, octyl, decyl, and dodecyl acrylates and methacrylates, the di- $C_1$ to $C_{12}$ normal and branched chain alkyl maleates, fumarates and itaconates, and vinyl acetate, propionate, butyrate, valerate, caproate, heptoate, 2-ethylhexanoate, caprylate, pelargonate, and laurate. Esters preferred on the basis of cost and availability are vinyl acetate, methyl methacrylate and ethyl acrylate.

The latices of the instant invention are prepared by substantially standard emulsion polymerization techniques. In the well known art of emulsion polymerization, one or more ethylenically unsaturated monomers are colloidally emulsified in an aqueous menstruum containing polymerization catalyst. The resulting colloidal emulsion is then subjected to conditions conductive to copolymerization of the monomer constituents thereof to thereby produce in situ an aqueous colloidal dispersion of the corresponding polymeric product. This colloidal polymer dispersion is commonly referred to as a latex.

In copolymerizing the three monomers to prepare the latices of the instant invention, the ratio of monomers charged to the reaction vessel is not the same as the ratio incorporated into the final product due to the variation in polymerization reactivity on the part of the various monomers. As heretofore indicated, the ratio of each of the three monomers incorporated into the terpolymer is critical in achieving the desired latex products and the improved coatings and paints prepared therefrom. The feed ratios which will afford polymer of the desired composition can either be calculated after determining the reactivity ratios of the three monomers at the desired polymerization reaction conditions or empirically by varying monomer charge and/or feed ratio until it is ascertained what ratio will afford polymer product of the desired composition. Either method is well known in the polymerization art.

Either a batch or a continuous polymerization procedure may be utilized. In a continuous polymerization, a suitable emulsified mixture of comonomers and initiators is continuously passed through a reaction zone maintained at the desired temperature and pressure.

The reaction zone size and reaction mixture flow rate therethrough being such as to provide an appropriate residence time.

Preferably, the molecular oxygen content of the monomers and of the aqueous polymerization menstruum will be as low as possible, although up to about 300 p.p.m. of oxygen based on the weight of the total reaction medium can be tolerated. The temperature at which the polymerization is effectuated is determined primarily by the actuation temperature of the particular catalyst chosen from among the many known to be suitable for free radical-induced vinyl polymerizations. A suitable polymerization temperature is within the range 0° C. to 75° C., preferably 20° C. to 40° C. The polymerization can be carried out at any pressure between 750 and 30,000 p.s.i.g. The preferred polymerization pressure is 3000–20,000 p.s.i.g. Any pressure drop which occurs during polymerization is advantageously made up by addition of vinyl chloride or a vinyl chloride/ethylene mixture.

For most applications, it is desirable to have latices containing from about 30 to about 70 percent of polymer solids by weight based upon the whole latex. Latices containing less than 30 weight percent polymer are uneconomical to prepare and use. Latices containing greater than about 70 weight percent polymer solids are generally less stable to forces of mechanical shear and similar environmental factors than more dilute latices. The preferred latices of the instant invention have a polymer content ranging from about 40 to about 50 weight percent.

Most latices have particle sizes ranging from about 200 angstrom units to about 3000 angstrom units or greater. The latices of the instant invention preferably have particle sizes ranging from about 200 to about 2000 angstrom units. In general, the larger the particle size, the greater the tendency of a latex to undergo phase separation. The particle size of the latex can be regulated by the quantity of emulsifier employed. The more emulsifier used, the smaller the particle size.

The term emulsifier or emulsifying agent, as used herein, connotes molecules which do not copolymerize and which owing to special structural features are capable of micelle formation in aqueous solution and are thereby able to form stable dispersions of monomers and polymers that are substantially insoluble in water. Such emulsifiers typically are molecules that have both hydrophobic (lipophilic) and hydrophilic groups and which reduce the surface tension of water. In preparing the latices of the instant invention, a single emulsifying agent or a combination of emulsifying agents can be used. Emulsifying agents useful in preparing the latices of the instant invetnion can be either nonionic or anionic in nature. Suitable anionic emulsifying agents include the alkali metal and alkaline earth metal salts of alkylated benzene and naphthalene sulfonic acids and alkyl sulfuric acids. Suitable nonionic emulsifying agents include sulfonated fatty acid amides, fatty alcohol or fatty amine/ethylene oxide addition products, ethylene oxide adducts of alkylene glycols and of alkyl phenols.

Preferred emulsifying agents for use in preparing the latices of the instant invention are the alkali metal $C_1$ to $C_{12}$ alkyl benzene sulfonates and $C_1$ to $C_{12}$ alkyl sulfates. The emulsifier is preferably present in an amount of about 0.3 to about 3.0 weight percent based upon the water present.

The copolymerization reaction used to prepare the latices of the instant invention is advantageously carried out at a pH between about 7 and 12, preferably 8 and 11. This pH can be initially achieved by adding small amounts of inorganic base to the reaction medium. It is frequently advantageous to add buffering agents to the reaction medium to prevent a drop in pH to the acid region during the course of polymerization. Suitable buffering agents for this purpose include sodium or ammonium bicarbonate, borax, sodium carbonate, acetate, citrate, tartrate, and benzoate, and mixtures of primary and secondary potassium phosphate. The amount of buffer is generally about 0.1 to 0.5 percent based upon the weight of the three monomers present.

Examples of suitable polymerization catalyst include organic peroxides such as diacetyl peroxide, dibenzoyl peroxide, dilauroyl peroxide, acetylbenzoyl peroxide, diethyl dioxide, ethylmethyl dioxide, t-butyl peracetate, and cumene hydroperoxide, and azo catalysts such as azobisisobutyronitrile. Although any one of the above-mentioned peroxy compounds is suitable, two or more may be utilized conjointly. Also suitable are the combination-type catalysts employing both reducing agents and oxidizing agents. Such combined catalyst systems are known as redox catalyst systems. The reducing agent is referred to as the activator and the oxidizing agent as the initiator. Suitable oxidizing agents include, for example, potassium, sodium and ammonium persulfates and perborates, hydrogen peroxide, and organic peroxides of the type previously indicated to be suitable unitary catalysts. Suitable reducing agents include sodium formaldehyde sulfoxylate, ascorbic acid, ammonium and alkali metal sulfites, thiosulfates, hydrosulfites, and metabisulfites, and tertiary aromatic amines such as, N-dimethyl aniline. Preferably the reducing agent and the oxidizing agent are present in stoichiometrically equivalent amounts.

In preparing the latices of the instant invention, the preferred catalyst is of the water-soluble rather than the oil-soluble type. Most preferably the catalyst is a redox system consisting of ammonium or alkali metal persulfate and ammonium or alkali metal metabisulfite.

The amount of catalyst that may be used in generally 0.001 to 5.0 percent of the weight of the three monomers, preferably 0.1 to 1.5 percent. If a redox system is utilized, from 0.001 to 5.0 percent, preferably 0.1 to 1.5 percent of the oxidizing agent, based on the weight of the three monomers, is used and a stoichiometrically equivalent amount of reducing agent. If desired, in either a batch or a continuous process, catalyst can be added incrementally during the course of the polymerization.

As heretofore indicated, the latices of the instant invention may advantageously be used to coat substrate materials such as paper, paperboard, fabric or wood or compounded to form a water-based paint having improved mildew and fire resistance in comparison with conventional paint formulations.

For use in coating applications or for formulation into paints, there are generally added to the latices of the instant invention chemical and mechanical latex stabilizers. Suitable mechanical stabilizers which protect against shear-induced demulsification are anionic emulsifiers of the type utilized in the emulsion polymerization of the component monomers. However, addition of excess emulsifier must be avoided or the films will be unduly water sensitive. Chemical stabilizers, which prevent coagulation by divalent metal ions, are nonionic emulsifying agents. Suitable ones include the various polyoxy ethylene glycols.

Paint utilizing the latices of the instant invention will preferably contain appropriate quantities of chemical and mechanical stabilizers as above indicated, plus thickeners, anti-foamants, pigments, pigment dispensants, and the like. The use of these materials in conjunction with the latex of the instant invention provides a water-base paint composition having the desirable characteristics and surprising advantages hereinabove referred to.

The paint of the instant invention may be prepared from the latex by conventional techniques used in the preparation of paints from synthetic polymer latices. In our preferred method of preparing the paint, a pigment is mixed with dispersant and a water-soluble thickner to form a heavy paste. At this point, an antifoam agent such as tributyl phosphate may be added, if desired. This paste is then diluted and thereby reduced in viscosity with the latex.

Suitable water-soluble thickeners or protective colloids include methyl cellulose and polyvinyl alcohol. The thickener is suitably present in an amount of from about 0.01 to about 1.5 weight percent based upon the total weight of the latex paint.

Suitable pigment disperstants include polymerized sodium salts of alkyl naphthalene sulfonic acid and the guanidine salt of monoethyl phenol. Suitable pigments for use in conjunction with the latex of the instant invention include titanium dioxide, lithopone, diatomaceous silica, talc, mica, iron oxide, cadmium red, toluidene red, chromium oxide, phthalocyanine, carbon black and the like. The pigment particle size should not be greater than about 50 microns and the pigment may be present in an amount of up to about 6 pounds per gallon of finished paint.

The quantity of water present in the finished paint formulation should be such as to achieve a pigment-volume concentration ranging from about 40 to about 75 percent.

The invention can be more fully understood by reference to the following examples. All parts are parts by weight unless otherwise expressly noted.

Latices were prepared in both one-gallon and one-liter stainless steel autoclaves of 30,000 p.s.i. rating. The gallon reactor was equipped with a magna-drive stirrer, water jacket, and internal cooling coil. The one-liter reactor was equipped with a motor-driven paddle stirrer and water jacket. Temperature and pressure-sensing probes were mounted in the reactor heads and connected to suitable recorders. The reactors were thoroughly purged with nitrogen before the addition of the initial charge and distilled deoxygenated water used in all cases in making up the aqueous phase of the reaction mixture. Aqueous solutions of catalyst and buffering agent were pumped into the reactors under pressure and the ethylene fed from standard cylinders compressed further before adding to the reactor. Vinyl chloride was distilled and charged in liquefied form with a Ruska pump. The following specific examples are illustrative.

EXAMPLE 1

After purging the one-gallon reactor with nitrogen, there was charged 66 grams of freshly distilled vinyl acetate and a mixture of 74 g. of Nacconol 97 solution containing 24.2% solids and 200 ml. of water. Allied Chemical Corporation's Nacconol 97 is a highly purified dodecyl benzene sulfonate. The reactor was sealed; agitation started, and 830 g. of ethylene and 935 g. of vinyl chloride pumped into the reactor. This was followed by addition of 300 ml. of water and 500 ml. of an aqueous solution containing 5.3 g. of ammonium persulfate and 6.5 g. of sodium carbonate. Then, 65 ml. of an aqueous solution containing 2.85 g. of sodium metabisulfite was added and the polymerization carried out by maintaining the temperature at 28°–30° C. and the operating pressure at 12,500–13,000 p.s.i. The pressure was maintained by pumping in vinyl chloride and the reaction run for 2 hours after which it was stopped by the addition of 15 ml. of an aqueous solution containing 1 g. of thiourea. Pressure on the reactor was then released over a period of 5 to 6 hours at a temperature of 30°–35° C. There was obtained 1766 g. of a latex containing 50% solids.

A portion of the latex was coagulated by freezing, the solids removed by filtration, washed with water until free of all water-soluble material, as shown by a clear filtrate, and dried under vacuum at about 40°–50° C. The terpolymer obtained contained 41.0% chlorine and 1.8% vinyl acetate. It had an inherent viscosity of 1.25 as determined from a 0.5% solution in cyclohexanone at 25 2C. The Tg was 6° C., as determined by a modified ASTM Test D–1525 procedure in which a molded specimen was cooled in Dry Ice after which it was mounted in a cold bath and subjected to the pressure of the 1-mm.$^2$-flat, Vicat needle. The temperature of the cold bath in which the test specimen was immersed was allowed to rise and that temperature at which the needle had penetrated 1 mil into the specimen noted as the Tg. It has been found that this procedure gave values which correlated well with those obtained by the Clash-Berg method of ASTM Test D1043, which required larger specimens that were difficult to mount in the Clash-Berg apparatus when the material undergoing test had Tg's below room temperature.

A portion of the latex was stabilized by the addition of 1.6% of Nacconol 97 (for mechanical stability), 4.3% of Wyandotte Chemical's Pluoronic F–38 (polyoxyethylene nonionic emulsifier for chemical stability), and 0.70% of Du Pont's PVA 50–42 (polyvinyl alcohol for thickening and storage stability). Mechanical stability was indicated by the stability of the compounded latex after stirring for 1 minute in a high-speed Waring blender. Addition of an aqueous 10% calcium chloride solution showed chemical stability, i.e., no coagulation or separation of solids took place.

Films were cast with the stabilized latex on smooth glass plates using masking tape fitted on the sides of the plates so as to retain the latex within the frame formed by the tape. Latex was poured on the plate and spread by drawing a bar over the assembly giving a wet-film thickness of about 9 mils. The cast films were allowed to dry at room temperature over night; then, the dry film of about a thickness of 2–3 mils was removed from the plate and conditioned for 24 hours at 50% relative humidity and 23° C. before testing. The films had an ultimate tensile strength of about 1410 p.s.i. and an ultimate elongation of 530%. Film dried in an oven for 1 hour at 64° C. had a strength of 1710 p.s.i. and an elongation of 500%, toughness 855,000.

EXAMPLE 2

After purging a one-liter reactor with nitrogen, there was charged 20 g. of a 24.2% aqueous solution of Nacconol 97, 10 ml. of water and 13 g. of inhibitor-free ethyl acrylate. The reactor was then sealed, agitation started, and 291 g. of ethylene and 195 g. of vinyl chloride pumped into the reactor. This was followed by addition of 149 ml. of an aqueous solution containing 1.17 g. of ammonium persulfate and 1.26 g. of sodium carbonate. Polymerization was then initiated by addition of 75 ml. of an aqueous solution containing sodium metabisulfite. The temperature was maintained at 28°–30° C. and the pressure at 7500–8000 p.s.i. by pumping in vinyl chloride. After operating for 2.6 hours, during which time 80 ml. of vinyl chloride was added, the reactor was vented over a period of 1.4 hours. There was obtained 463 g. of a latex containing 44.4% solids. Isolation of the terpolymer and analysis showed the product to have a Tg of 5° C., an inherent viscosity of 1.25, and to contain 71.3% by weight of vinyl chloride, 24.4% by weight of ethylene, and 4.3% by weight of ethyl acrylate. Air-dried film of the latex had a tensile strength of 1600 p.s.i., an ultimate elongation of 540% giving a toughness index of 862,000.

EXAMPLE 3

Additional runs were made using the procedures of Examples 1 and 2 to delimit the range of composition which would provide the improved terpolymers of the instant invention. The results, as shown below, indicate that suitable terpolymers have a vinyl chloride content ranging from not less than 66% to not more than 79% and an ethylene content ranging from not less than 17% to not more than 30%. Unsaturated ester contents of greater than about 10% afford coatings which are unduly water sensitive. An unsaturated ester content of less than about 1.0% does not afford terpolymers having improved properties. Only terpolymers having the composition 66% to 79% vinyl chloride, 17% to 30% ethylene, and 1% to 10% unsaturated ester afford room temperature coalescable films having toughness values greater than 450,000.

| Weight percent composition | | | Inherent viscosity[1] | Tg, (° C.)[2] | Ultimate elongation, ASTM D-1708-66 | Ultimate tensile strength, ASTM D-882-64T | Toughness value |
|---|---|---|---|---|---|---|---|
| Vinyl chloride | Ethylene | Unsaturated ester | | | | | |
| | | Vinyl acetate | | | | | |
| 75.7 | 24.3 | 0 | 9.77 | 6.0 | 530 | 400 | 212,000 |
| 77.6 | 22.4 | 0 | 1.40 | 7.0 | 300 | 510 | 153,000 |
| 79.7 | 16.4 | 3.9 | 1.08 | 18.5 | [3] | | |
| 76.0 | 21.6 | 2.4 | 1.05 | 17.5 | 270 | 1,920 | 517,000 |
| 73.4 | 23.0 | 3.6 | 9.98 | 12.0 | 459 | 1,860 | 836,000 |
| 72.7 | 25.1 | 2.2 | 0.56 | 7.5 | 530 | 880 | 466,000 |
| 72.4 | 26.1 | 1.5 | 1.15 | 8.5 | 519 | 1,640 | 836,000 |
| 68.6 | 29.7 | 1.7 | 1.09 | 5.0 | 639 | 1,470 | 925,000 |
| | | Ethyl acrylate | | | | | |
| 68.4 | 23.9 | 7.7 | 1.53 | 6.5 | 565 | 1,230 | 695,000 |
| 65.7 | 30.4 | 3.9 | 1.40 | −7.0 | >1,250 | [4] 160 | >200,000 |

[1] Determined on an 0.5% solution in cyclohexanone at 25° C.
[2] Modified ASTM Test D-1525.
[3] No coalescence.
[4] Extremely low.

EXAMPLE 4

Suitable terpolymers affording high toughness value coatings were prepared in accordance with the procedure of Example 1 utilizing the following unsaturated esters:

n-butyl acrylate
isoamyl acrylate
octyl methacrylate
isopropyl methacrylate
di-2-ethylhexyl maleate
di-2-ethylhexyl itaconate
di-2-ethylhexyl fumarate
vinyl butyrate
vinyl pelargonate
vinyl laurate
methyl methacrylate

EXAMPLE 5

Evaluation of Terpolymer as a Paperboard Coating (A) Terpolymer preparation.—After purging the one-gallon reactor with nitrogen, there was charged 74 g. of an aqueous 24.2% Nacconol 97 solution, 20 ml. of deoxygenated distilled water, and 61 g. of freshly distilled vinyl acetate. The reactor was then sealed, agitation started, and 985 g. of ethylene and 935 g. of distilled vinyl chloride pumped into the reactor. This was followed by addition of 300 ml. of deoxygenated distilled water and 500 ml. of an aqueous solution containing 3.57 g. of ammonium persulfate, 4.24 g. of potassium phosphate and 0.8 g. of sodium hydroxide. Then 75 ml. of a solution of 19.75 g. of sodium metabisulfite in 800 ml. of distilled, deoxygenated water was added portion-wise over a period of 3.3 hours while maintaining a reaction temperature of 29°–30° C. and a pressure of 10,000–11,200 p.s.i. by pumping in a total of 175 g. of vinyl chloride. 1645 grams of a latex containing 49.4% solids was obtained after venting the reactor. Isolation and analysis of a portion of the solids showed it to contain 76.0% by weight of vinyl chloride, 21.6% by weight of ethylene and 2.4% by weight of vinyl acetate. The terpolymer had an inherent viscosity of 1.05 and a Tg of 17.5° C.

A portion of this latex was mechanically and chemically stabilized by the incorporation therein of 2.2% Nacconol 97 solution, 3.8% Pluoronic F–38 and 0.2% PVA 50–42, the amounts used being based on percent solids in the latex. Film cast from the latex had a tensile strength of 1920 p.s.i. and an ultimate elongation of 270%, toughness 518,000.

(B) Paperboard coating. — 300 parts of Astra Glaze(TM) kaolin clay was dampened with a portion of 147.15 parts of deionized water and ground in a ball mill for 16 hours with 0.45 part of Calgon T dispersant (Calgon Corporation, Na-Zn hexametaphosphate) and with 2.5 parts of Nopco 14 defoamer (Nopco Chemical Company). Then, 40.5 parts of a 50% solution of alpha protein in water (Chemurgy Division, Central Soya Company) was dispersed in the grind followed by addition of the remainder of the water and 114 parts of the stabilized latex prepared in (A) above. This resultant mixture was then applied by rolling on 20-mil thick, 160-lb. raw-stock paperboard to give a 3-mill dried coating. A similar composition was prepared by applying Monsanto's commercial Gelva 925 polyvinyl acetate latex to the paperboard.

The terpolymer coating showed a higher surface glass than the Gelva control. It leveled better than the control with fewer surface imperfections and also showed sharper printing. The terpolymer coating also showed better resistance to water. A drop of water on the film could be wiped off after 5 minutes without changing the surface characteristics, whereas the control film bubbled and raised from the paperboard substrate.

EXAMPLE 6

The stabilized latex of Example 5, was used in the formulation of an exterior paint having a pigment-volume concentration of 41.0%. This concentration is in the upper range of that found in commercial exterior paints. This term is defined as the volume of pigment divided by the volume of pigment plus the volume of the polymer. The paint was prepared by first making a paste of the pigment and then adding the latex to obtain the required viscosity and pigment-volume concentration. The paste composition given in parts by weight was as follows:

| | |
|---|---|
| Titanox RA50 (Du Pont TiO$_2$) | 200 |
| Atomite (Thompson Weinman and Co. CaCO$_3$) | 75 |
| Dexad 11 (Dewey and Almy Co., sodium salts of polymerized alkyl naphthalene sulfonic acids, anionic emulsifier, 20% solution) | 10 |
| Methocel 65HG (Dow Chemical Company, methyl cellulose protective colloid, 2% solution) | 151 |
| Ross and Rowe 55 (Ross and Rowe, Inc., interface modifier, pigment dispersion aid) | 4 |
| Nopco 1497TV (Nopco Chemical Company, long-chain fatty acid oil defoamer) | 3 |

These ingredients were combined and ground into a paste, in a quart-size ball mill, with about one-third of the jar filled with 1/4"-diameter ceramic balls, over a period of 18 hours. Then, 375 parts of the 50% solids stabilized latex was added to the pigment paste to give a pigment-volume concentration of 41.0%. Volumes were computed based on a terpolymer density of 1.25 g./cc. as determined in a gradient density tube and on values of 4.2 g./cc. for the Titanox, 2.7 g./cc. for the Atomite, and 2.6 g./cc. for the Nytal 300. Since the total weight of pigment used was 350 grams, the pigment volume was 104.1 cc.

EXAMPLE 7

Latex paint of Example 6 was converted into a dry film according to the procedure outlined in Example 1. Samples of the film were exposed in an Atlas twin-carbon arc weatherometer, together with similarly prepared samples of standard commercial exterior latex paints (ASTM Test D–822–60). The ethylene/vinyl chloride/vinyl acetate terpolymer-based composition film was definitely better than those of the commercial materials in dimensional stability and approximately equivalent in resistance to yellowing. The amount of yellowing was determined with a Hunter photovoltmeter using magnesium oxide reflectance as a 100% standard (ASTM Test D–1925–63T). Results of the tests are summarized as follows:

a slight increase in yellowing to 6.5%. Use of high pigment-volume concentration is economically advantageous in reducing cost with less expensive pigments. Concentrations of pigment on the order of 35–40% are used in most exterior paints.

EXAMPLE 8

After purging the one-gallon reactor with nitrogen, there was charged 74 g. of a 24.2% aqueous Nacconol 97 solution, 20 ml. deoxygenated distilled water and 57 g. of freshly distilled vinyl acetate. The reactor was sealed, agitation started, and 935 g. ethylene and 890 g. of freshly distilled vinyl chloride pumped into the reactor. This was followed by addition of 250 ml. of deoxygenated distilled water and 500 ml. of an aqueous solution containing 3.46 g. ammonium persulfate, 0.78 g. sodium hydroxide and 4.12 g. potassium phosphate. Then 60 ml. of an aqueous solution containing 24.1 g. sodium metabisulfite in 1000 ml. of water was added incrementally over a period of 3.5 hours. The reaction proceeded at 15,000–15,300 p.s.i. and 30° C. with the addition of 223 g. of vinyl chloride to maintain the pressure after which reaction was terminated by the addition of 15 ml. of a 6.77% aqueous thiourea solution. After venting and cooling, there was obtained 1750 g. of a latex containing 43.5% solids.

The foregoing procedure was repeated three times and properties of the products obtained in each test found to be as follows:

| Terpolymer | | Film | | |
|---|---|---|---|---|
| Glass [1] | Inherent viscosity | Coalescense | U.T.S. (p.s.i.) | U.E. (percent) |
| 8.5 | 1.15 | Good | 1,640 | 510 |
| 9.0 | 0.81 | do | 1,330 | 520 |
| 8.0 | 1.11 | do | 1,740 | 520 |
| 9.5 | | do | 1,330 | 495 |

[1] Transition temperature (° C.).

The latices obtained in these four runs were stabilized with a Nacconol 97 (2.8%), Pluoronic F–38 (3.5%) and PVA–50–42 (0.2%) mixture and combined to give about one gallon of latex containing 42.4% solids for evaluation in interior and exterior paint formulations.

(A) Vinyl terpolymer interior flat latex finish

| Type of latex | Trade name | Manufacturer | Exposure yellowing Hours | Exposure yellowing Percent | Film condition |
|---|---|---|---|---|---|
| Acrylic | Lucite | Du Pont | 1,849 | 0 | Flexible, slight wrinkling. |
| Vinyl chloride/acrylic | Sunproof | Pittsburgh Plate Glass. | 1,849 | 6 | Brittle, smooth. |
| Vinyl acetate/alkyl maleate | Flexbond | Air Reduction. | 1,250 | 1.3 | Wrinkled severely, smooth. |
| Ethylene/vinyl chloride/vinyl acetate | | Example 1 | 1,849 | 3.8 | Smooth, not brittle. |

Exposure of a film (1849 hours) identical to the paint of Example 6, except in having a pigment-volume concentration of 48%, also gave a smooth, nonbrittle film with This latex was formulated into an interior flat finish by first preparing a paste using a high speed impeller. Composition of the paste was as follows in parts by weight.

| | |
|---|---:|
| Water | 100 |
| 15,000 cps. Methocel (2% solution), methyl cellulose protective colloid | 100 |
| Tamol 731 (25% solution), Rohm and Haas, anionic dispersing agent | 4 |
| Atlas G-3300, Atlas Co., alkyl aryl sulfonate anionic emulsifier | 18 |
| Balab 748, Balab Industries, defoamer | 2 |
| Attagel 40, Minerals and Chemicals, Phillips Corporation, colloidal clay thickener | 10 |
| Titanox RA-50, Titanium Pigment Corporation, rutile TiO$_2$ | 225 |
| ASP-400, Minerals and Chemicals, Phillips Corporation, aluminum silicate pigment | 58 |
| Atomite, Thompson-Weinman, calcium carbonate filler | 125 |
| Celite 281, Johns-Manville Corp., diatomaceous earth | 50 |
| Super Ad-It, Nuodex Co., diphenyl mercury dodecenyl succinate fungicide | 0.3 |

To this was added, with high-speed dispersion, the following:

| | |
|---|---:|
| Water | 165 |
| 15,000 cps. Methocel (2% solution), methyl cellulose protective colloid | 37.6 |
| Butyl carbitol acetate, Union Carbide Corporation, diethylene glycol monobutyl ether acetate | 6 |
| Terpolymer latex (42.4% solids), Allied Chemical | 244.8 |
| 15,000 cps. Methocel (2% solution), methyl cellulose protective colloid | 65.5 |

This produced a finish having a pigment-volume concentration of 62.8%.

(B) Commercial interior flat paint

Another latex based on a commercially acceptable polyvinyl acetate copolymer was formulated into an interior flat finish in a similar manner. Composition of the paste was as follows:

| | |
|---|---:|
| Water | 100 |
| 15,000 cps. Methocel (2% solution), methyl cellulose protective colloid | 100 |
| Tamol 731 (25% solution), Rohm and Haas, anionic dispersing agent | 4 |
| Atlas G-3300, Atlas Co., alkyl aryl sulfonate anionic emulsifier | 18 |
| Potassium Tripolyphosphate | 2 |
| Propylene glycol | 15 |
| Nopco NDW, Nopco Chemical Company, defoamer | 2 |
| Attagel 40, Minerals and Chemicals, Phillips Corporation, colloidal clay thickener | 10 |
| Titanox RA-50, Titanium Pigment Corporation, rutile TiO$_2$ | 225 |
| ASP400, Minerals and Chemicals, Phillips Corporation, aluminum silicate pigment | 58 |
| Atomite, Thompson-Weinman, calcium carbonate filler | 125 |
| Celite 281, Johns-Manville Corporation, diatomaceous earth | 50 |
| PMA-18, Tenneco Chemicals, Nuodex Division, phenyl mercuric acetate fungicide | 0.3 |

To this was added the following:

| | |
|---|---:|
| Water | 206.3 |
| 15,000 cps. Methocel (2% solution), methyl cellulose protective colloid | 37.6 |
| Texanol isobutyrate, Eastman Chemical Products, Inc., 2,2,4-trimethyl-1,3-pentenediol monoisobutyrate | 6.0 |
| Celanese CL-222 (55% solids), Celanese Corporation, polyvinyl acetate copolymer latex | 188.5 |
| 15,000 cps. Methocel (2% solution), methyl cellulose protective colloid | 65.5 |

This produced a finish having a pigment-volume concentration of 62.8%.

Evaluation of interior latex flat finishes.—Some of the important properties of finishes prepared with the formulations of Parts A and B and which might be affected by the latex compoistion were tested. The vinyl terpolymer-based paint was found to be significantly better than the control in film appearance. Cratering left when the foam broke in the drying paint film and smoothness of rolled paint was superior. Color acceptance, as shown by observation of the relative depth of color produced in a drawdown made from paints tinted with the same concentration of tinting color (2%), was also significantly better. Scrub resistance of the new film was significantly better than that of the control, as shown by an evaluation in accordance with ASTM Test D-2486. Film break was noted in 30 cycles with the control paint, whereas this did not occur until 95 cycles with the terpolymer paint.

The fire retarding ASTM Test D-1361 showed the terpolymer paint to be much better than the control. It reduced fire spread about 50%, whereas the control paint-treated sample was substantially equivalent to bare wood (95% versus 100%).

EXAMPLE 9

(A) Vinyl terpolymer exterior latex paint

The latex of Example 8 (A) was also formulated into an exterior paint by first preparing a pigment paste and then dispersing it in the latex phase. Composition of the paste was as follows in parts by weight:

| | |
|---|---:|
| Water | 46 |
| 15,000 cps. Methocel (2% solution), methyl cellulose protective colloid | 125 |
| Tamol 850 (25% solution), Rohm and Haas, anionic dispersing agent | 7 |
| Igepal CO-610, General Aniline and Film Corporation, nonionic alkylphenoxypoly (oxyethylene) ethanol surfactant | 4 |
| Texanol, Eastman Chemical Products, Inc., 2,2,4-trimethyl-1,3-pentanediol monoisobutyrate | 7 |
| Colloid 677, Colloid Chemicals, defoamer | 3 |
| TiPure R-610, Du Pont, rutile TiO$_2$ | 150 |
| Lorite, National Lead Company, CaCO$_3$-diatomaceous earth extender | 75 |
| Snowflake, Allied Chemical Corporation, sodium sesquicarbonate | 5 |
| Super Ad-It, Nuodex Company, diphenyl mercury dodecenyl succinate fungicide | 5 |

To this was added, with high-speed dispersion, the following:

| | |
|---|---:|
| 15,000 cps. Methocel (2% solution), methyl cellulose protective colloid | 75 |
| Terpolymer latex (42.4% solids), Allied Chemical | 454 |
| 15,000 cps. Methocel (2% solution), methyl cellulose protective colloid | 75 |

This produced a finish having a pigment concentration of 36.0%.

(B) Commercial exterior latex paint

A standard commercial vinyl acetate-ethylene copolymer latex, Aircoflex 510, produced by Airco Chemical Company, was formulated into an exterior finish in a Feb. 1, 1972   A. H. DRELICH ET AL   3,639,327
ADHESIVE COMPOSITION Filed May 27, 1968   3 Sheets-Sheet 1

Fig.1.   Fig.1a.
                   10